(12) United States Patent
Vanzante et al.

(10) Patent No.: US 9,160,688 B2
(45) Date of Patent: Oct. 13, 2015

(54) SYSTEM AND METHOD FOR SELECTIVE DIRECT MEMORY ACCESS

(75) Inventors: Craig A. Vanzante, Roseville, CA (US); Robert L. Faulk, Jr., Roseville, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1411 days.

(21) Appl. No.: 12/494,993

(22) Filed: Jun. 30, 2009

(65) Prior Publication Data

US 2010/0329257 A1    Dec. 30, 2010

(51) Int. Cl.
*H04L 12/28* (2006.01)
*H04L 12/861* (2013.01)

(52) U.S. Cl.
CPC ............ *H04L 49/9063* (2013.01); *H04L 49/90* (2013.01); *H04L 49/9042* (2013.01); *H04L 49/9094* (2013.01)

(58) Field of Classification Search
None
See application file for complete search history.

(56) References Cited

U.S. PATENT DOCUMENTS

| 5,175,818 | A | 12/1992 | Kunimoto et al. |
| 6,092,116 | A | 7/2000 | Earnest et al. |
| 6,700,887 | B1 | 3/2004 | Tsujimoto |
| 7,139,848 | B1 | 11/2006 | Murray et al. |
| 7,257,758 | B1 | 8/2007 | Manula et al. |
| 7,266,131 | B2 | 9/2007 | Mitchell |
| 2004/0107361 | A1* | 6/2004 | Redan et al. ................... 713/201 |
| 2008/0240111 | A1* | 10/2008 | Gadelrab ................... 370/395.7 |

* cited by examiner

*Primary Examiner* — Nicholas Sloms
(74) *Attorney, Agent, or Firm* — Greer, Burns & Crain, Ltd

(57) ABSTRACT

A method of selective direct memory access (DMA) in a computer system having a network interface card (NIC), a processor subsystem, and a memory accessible to the subsystem, including the steps of the NIC receiving a plurality of packets from an external source; the NIC decoding a portion of each packet and determining whether the packet should be accepted by the computer system based on a predefined rule; and if the packet is accepted, selectively truncating the packet based on the predefined rule, and storing the truncated packet in the memory.

24 Claims, 2 Drawing Sheets

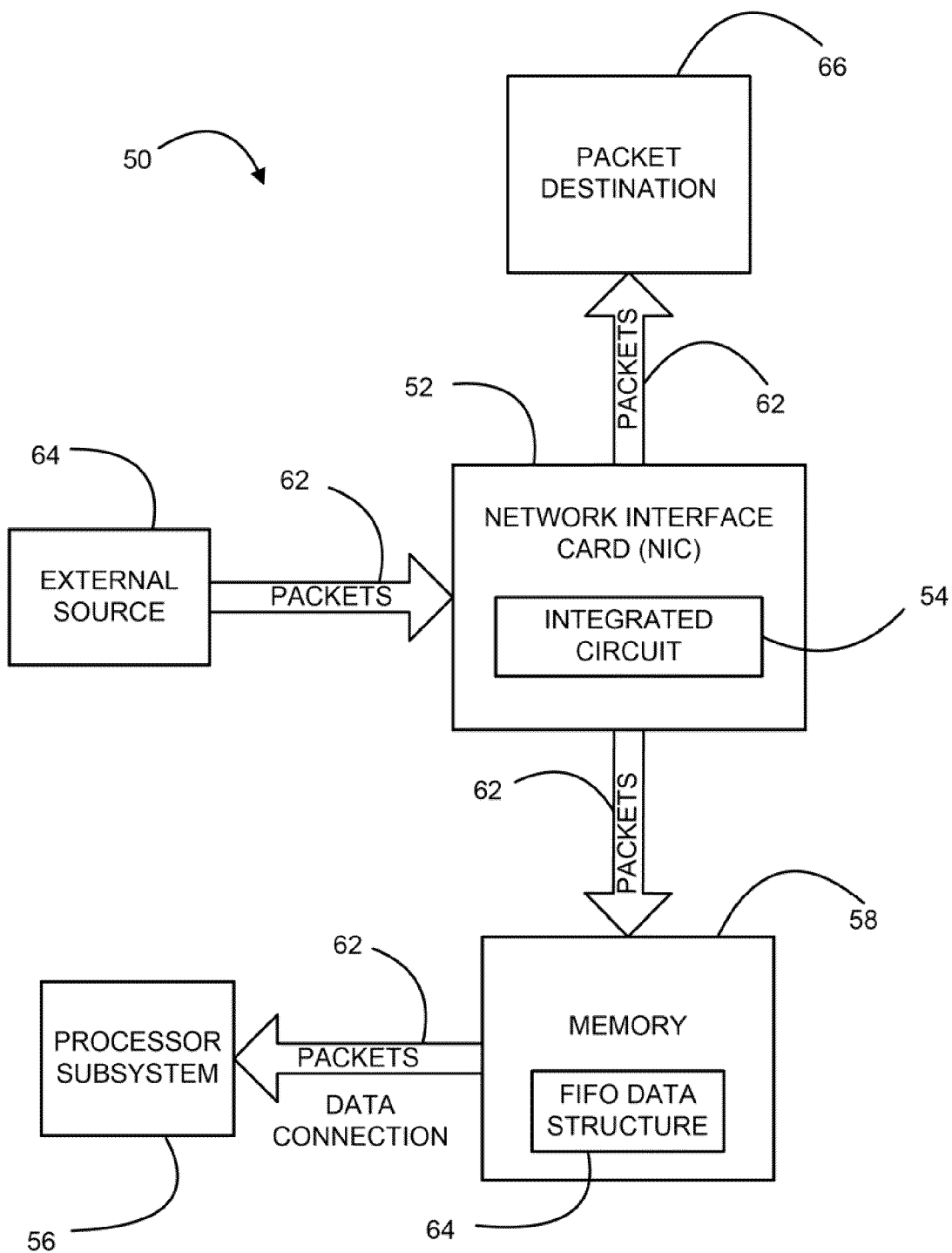

SYSTEM AND METHOD FOR SELECTIVE DIRECT MEMORY ACCESS

BACKGROUND OF THE INVENTION

The present invention relates generally to the useful art of computer software programming and more specifically to software related to computer networks.

Computer network systems are established for, among other reasons, organizing and providing efficient communication of data between network devices. The Open Systems Interconnection Basic Reference Model (the "OSI Model") is a well-known, abstract description for communications and computer network protocol design, consisting of seven layers. A second, increasingly popular model is the TCP/IP model which describes a similar protocol in either four or five layers. While other layer models exist, the OSI and TCP/IP models are the most common. In each of these models, there exists a Network Layer (Layer Three) and a Data Link Layer (Layer Two).

The Network Layer provides the functional and procedural means of transferring variable length data sequences from a source to a destination by performing network routing functions. At a physical level, the Data Link Layer provides the functional and procedural means to transfer data between individual network entities, thus allowing for the transfer of data from a source to its ultimate destination in a network. Thus, the cumulative operations performed at the Data Link Layer allow for the transfer of data at the Network Layer. When referring to data being communicated, the data unit at the Data Link Layer is called a frame, while the data unit at the Network Layer is called a packet.

Due to the increasing volume of data communicated across modern networks, networked devices often become overloaded with data, causing a strain on the overall efficiency and reliability of the network. Inadequate CPU cycles and memory busses for receiving and retrieving packet data can lead to lost or "dropped" packets (i.e., data transfers are incomplete). This can result in a slower network response time, inaccurate verification and/or error reporting, or a variety of other errors depending on the application being run.

To reduce these network issues and improve network efficiency and reliability, systems are often designed with powerful processors that interface to high-speed, large, and complex memory systems. However, while such processors and memory systems help in reaching desired levels of network system performance, they are very expensive and often difficult to monitor and maintain.

Another approach to improving network system efficiency and reliability is to provide users with information regarding data that was lost, while still providing them with the portions of data that were successfully communicated across the network. While the transferred data is still incomplete, users are at least put on notice so that they can troubleshoot the issue and identify the problem.

Direct memory access (DMA) is another technique used to improve network system efficiency and reliability. In a system implementing DMA, DMA controllers are placed in computer systems to move blocks of data from one location to another without first having to pass through the CPU. This process is accomplished by having DMA controllers first decode packets to determine whether they should be accepted by a network system. If they are accepted, copies of the packets are typically stored in a high speed memory for a variety of purposes depending on the application accessing that data. For example, an application that tracks all packets coming from source A to destination B will determine whether the packet includes those specified source and destination address attributes, and if so, it copies the packet to a memory for quick and easy access in the future (e.g., to report a current summary of network traffic). The system processor is then relieved of the need to generate a long sequence of addresses to accomplish the transfer of data, thus relieving the system of valuable CPU use time. However, while DMA allows a system to forgo use of unnecessary CPU interaction, data must still be stored into a memory, thus requiring use of system bandwidth to move the data into the memory. Again, since large amounts of data are moved through networks, bandwidth gets quickly consumed, resulting in a strain on the network's resources, again contributing to a less efficient and less reliable system.

BRIEF DESCRIPTION OF THE DRAWINGS

FIG. 2 is a diagram of a system of the first embodiment of the present invention.

DETAILED DESCRIPTION

Figure 1:
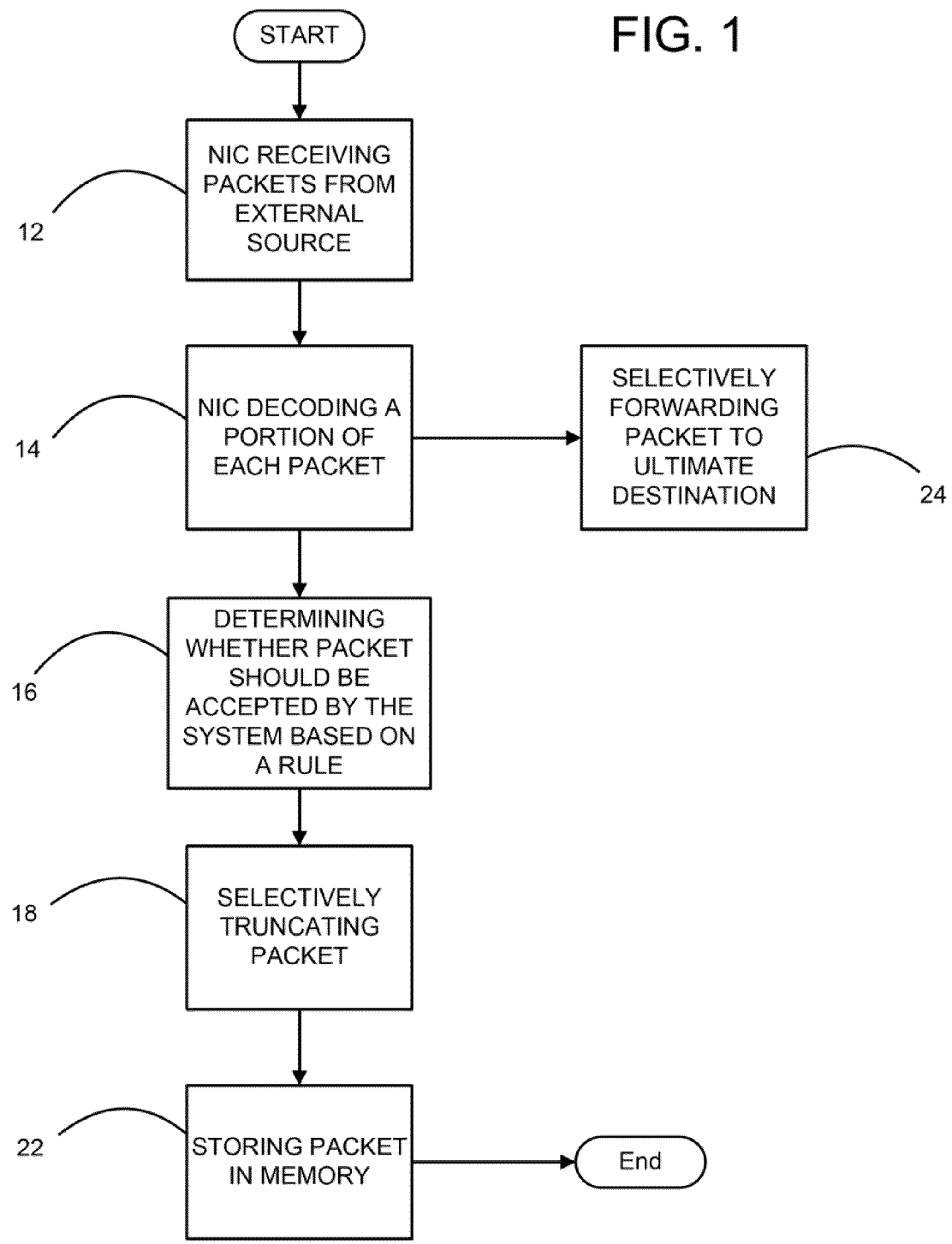
FIG. 1 is a flowchart illustrating the operating steps of the first embodiment of the method of the present invention.

When a packet is accepted by a network system, a copy of the packet is forwarded along a network path to eventually reach its appropriate destination. In addition, a DMA operation may also be performed in which a second copy of the packet gets stored in a memory for network monitoring and the like. To reduce the use of bandwidth when carrying out this DMA operation on the second copy of the packet, such packets are first truncated based on their reason for being accepted to the network system, before being stored in the memory. Therefore, only the relevant portion of the packet is kept, with the remainder of the packet being discarded. Since the portions of the packet that need to be stored in memory are typically very small relative to the full packet size, a large amount of bandwidth is likely to be spared using this truncation technique.

Turning now to FIG. 1, in the first embodiment, a method of selective DMA is described in a computer system having a network interface card (NIC) acting as a DMA controller, a processor subsystem, and a memory accessible to the subsystem. The method includes the steps of the NIC receiving a plurality of packets from an external source (step 12); the NIC decoding a portion of each packet (step 14) and determining whether the packet should be accepted by the computer system based on a predefined rule applied to the packet portion (step 16); and if the packet is accepted, selectively truncating the packet based on the predefined rule (step 18), and storing the truncated packet in the memory (step 22). It is noted that throughout this patent application, the use of the articles "a," "an," or "the" are synonymous with "at least one."

While the method of the first embodiment results in truncated packets and thus, discarding data, it is noted that the packet data may need to remain in its original state as it is sent through the network to its ultimate destination. (i.e., the application which truncates packets is typically only a monitoring application). Therefore, it is preferred that the method includes the step of selectively forwarding a copy of each packet to a destination based on a destination address attribute in the packet (step 24).

It is also noted that the portion of the packet that is decoded by the NIC can be any portion depending on the application, but will often include only the packet header as that is where the source and destination address information is kept. Further, since the predefined rule used to determine whether the packet should be accepted by the system is defined by the application, the rule can include any type of condition. Examples of rules used in monitoring applications include providing that only packets sent from a predefined source be accepted; providing that only packets destined for a predefined destination be accepted; providing that only packets sent from a predefined source to a predefined destination be accepted; and providing that only packets matching a predefined signature be accepted. A signature includes any specific data or pattern of data sought by the application. Signature-based rules like these are common in applications designed to catch intrusive or malicious packets (i.e., viruses).

Depending on which rule is applied, the packet is truncated such that only the relevant data sought by the application is kept. Such packet truncation, for example, would include discarding all data except a layer two or layer three address. These addresses could be either source or destination addresses depending on the rule being applied. Another example of packet truncation would be to discard the body portion, retaining only the header information. Such a rule is commonly applied when the body portion contains encrypted data which is not discernable and therefore is of no use to the system, but wherein the data in the header is still sought to be kept. Regardless of the truncation technique used, the truncated packet preferably includes metadata to indicate the original length of the packet.

It is noted that the rules discussed with respect to packet truncation may consider the state of the system in addition to the actual contents of the packet. For example, while one packet being sent through the system may be truncated according to a rule related to the packet's content, a second packet having identical content, but which is sent through the system at a later time, may not be truncated due to the state of the system being changed (e.g., a sampling rate being achieved).

In any of the examples described above, packet truncation reduces the use of memory bandwidth. Consider the example where an application seeks to monitor layer two addresses (i.e., which are typically contained in the first twelve bytes of a packet). In this example, only those twelve bytes would need to kept, permitting the rest of the packet to be discarded. The reduced bandwidth in this example is significant given that complete packets are often 1500 or 9000 bytes. As such, transferring twelve bytes instead of 1500 or 9000 bytes would dramatically decrease the bandwidth needed by the system. It is noted that in some instances, rules may overlap or be in conflict. For example, one rule may identify packets moving from a layer three network address A to a layer three network address B, while another rule may identify packets moving from a layer two address C to a layer two address D. However, it is possible that a single packet could satisfy both of these rules. In such cases, the packet is truncated such that the data sought by the application corresponding to each rule is maintained. This approach adheres to a "safer" or least restrictive methodology ensuring that data corresponding to both rules is kept for possible use by the application, rather than arbitrarily selecting data that corresponds to only one of the rules (e.g., the first rule to be triggered). This approach is preferred as it keeps potentially relevant data from being discarded. In the above example, where the layer two and layer three address rules are satisfied, the packet data containing both the layer two and layer three addresses would be kept. The application is then able to make use of any of this data depending on what is sought to be monitored at a given time.

Steps 18 and 24 selectively truncate and selectively forward packets as certain types of packets known to those in the art (e.g., those related to network system administration) should not be truncated and instead should be sent only to the memory. Such selective action is implemented by employing conditional tests to determine whether a given packets falls within a predefined group before performing the corresponding step.

It is preferred that the steps of the method of the first embodiment are performed by a computer program embedded in a memory on the NIC or by an integrated circuit embedded on the NIC. However, it is noted that the steps could be carried out by software or hardware stored elsewhere on the network.

Turning now to FIG. 2, in a system of the first embodiment of the present invention is a computer system 50 including a NIC 52 having an integrated circuit 54; a processor subsystem 56; and a memory 58 connected to the NIC and the processor subsystem. In this system 50, the integrated circuit 54 causes the NIC 52 to decode a portion of a packet 62 received from an external source 64, and causes the NIC to determine whether to accept the packet based on a predefined rule applied to the decoded portion. If accepted, the system 50 causes the NIC 52 to selectively truncate the packet 62 and store the truncated packet in the memory 58. It is preferred that the truncated packet 62 is stored in a first in, first out (FIFO) data structure 64 maintained in a random-access memory 58 for fast accessibility, which is made accessible to the processor subsystem 56. Further, when the NIC 52 receives a packet 62 from the external source 64, the integrated circuit 54 causes the NIC 52 to selectively forward the packet 62 to its ultimate packet destination 66 as further described in above in step 24. Notably, the present system and method for selective direct memory access is not limited to single processor systems. Indeed, the present system and method can be implemented in multi-processor systems and provides for customization in each processor sub-system. As such, one processor may use truncation techniques separate and distinct from those used by a second processor.

While particular embodiments of a system and method for selective direct memory access have been described herein, it will be appreciated by those skilled in the art that changes and modifications may be made thereto without departing from the invention in its broader aspects and as set forth in the following claims.

What is claimed is:

1. A method of selective direct memory access (DMA) in a computer system having a network interface card (NIC), a processor subsystem, and a memory accessible to the subsystem, comprising the steps of:
   the NIC receiving a plurality of packets from an external source;
   the NIC decoding a portion of each said packet;
   the NIC determining whether said packet should be accepted by the computer system based on a predefined rule; and
   if said packet is accepted, selectively truncating said packet based on said predefined rule, and storing said truncated packet in the memory.

2. The method of claim 1 further comprising the step of:
   selectively forwarding a copy of said packet to a destination based on a destination address in said packet.

3. The method of claim 1 wherein the rule is applied to said packet portion.

4. The method of claim 1 wherein the rule is based on a state of the system.

5. The method of claim 1 wherein the rule provides that only packets sent from a predefined source or destined to a predefined destination be accepted.

6. The method of claim 1 wherein the rule provides that only packets sent from a predefined source to a predefined destination be accepted.

7. The method of claim 1 wherein the rule provides that only packets matching a predefined signature be accepted.

8. The method of claim 1 further comprising the step of:
truncating said packet by discarding all data except a layer two source address.

9. The method of claim 1 further comprising the step of:
truncating said packet by discarding all data except a layer two destination address.

10. The method of claim 1 further comprising the step of:
truncating said packet by discarding all data except a layer three source address.

11. The method of claim 1 further comprising the step of:
truncating said packet by discarding all data except a layer three destination address.

12. The method of claim 1 wherein the packet has a header portion and a body portion, further comprising the step of:
truncating said packet by discarding said body portion.

13. The method of claim 1 further comprising the steps of:
if said packet is accepted by said system, truncating said packet based on a plurality of said predefined rules, wherein said packet maintains a combination of data corresponding to each said predefined rule.

14. The method of claim 1 wherein said decoding, said determining, said truncating, and said storing steps are performed by a computer program embedded in a memory on the NIC.

15. The method of claim 1 wherein said decoding, said determining, said truncating and said storing steps are performed by an integrated circuit embedded on the NIC.

16. A computer system comprising:
a network interface card (NIC) having an integrated circuit;
a processor subsystem; and
a memory connected to said NIC and said processor subsystem, wherein said integrated circuit causes said NIC to decode a portion of a packet received by an external source, causes said NIC to determine whether to accept said packet based on a predefined rule, and if accepted, causes said NIC to selectively truncate said packet in accordance with said predefined rule and store said truncated packet in said memory.

17. The system of claim 16 wherein said portion is a packet header.

18. The system of claim 16 wherein said integrated circuit causes said NIC to selectively forward said packet to a destination based on a destination address in said packet.

19. The system of claim 16 wherein the truncated packet is stored in a data structure stored in said memory.

20. The system of claim 19 wherein said data structure is a first in, first out structure (FIFO).

21. The method of claim 1, wherein said packet is truncated based on said predefined rule such that a portion of said packet used to satisfy said predetermined rule is retained in said truncated packet.

22. The method of claim 1, wherein packets that satisfy different predetermined rules are truncated in different ways.

23. The system of claim 16, wherein said packet is truncated based on said predefined rule such that a portion of said packet used to satisfy said predetermined rule is retained in said truncated packet.

24. The system of claim 16, wherein packets that satisfy different predetermined rules are truncated by said NIC in different ways.

* * * * *